June 18, 1946.  O. L. STARR  2,402,213
PISTON
Original Filed July 8, 1940   2 Sheets-Sheet 1

INVENTOR.
OSCAR L. STARR
BY Charles M. Finger
ATTORNEY.

June 18, 1946.   O. L. STARR   2,402,213
PISTON
Original Filed July 8, 1940   2 Sheets-Sheet 2
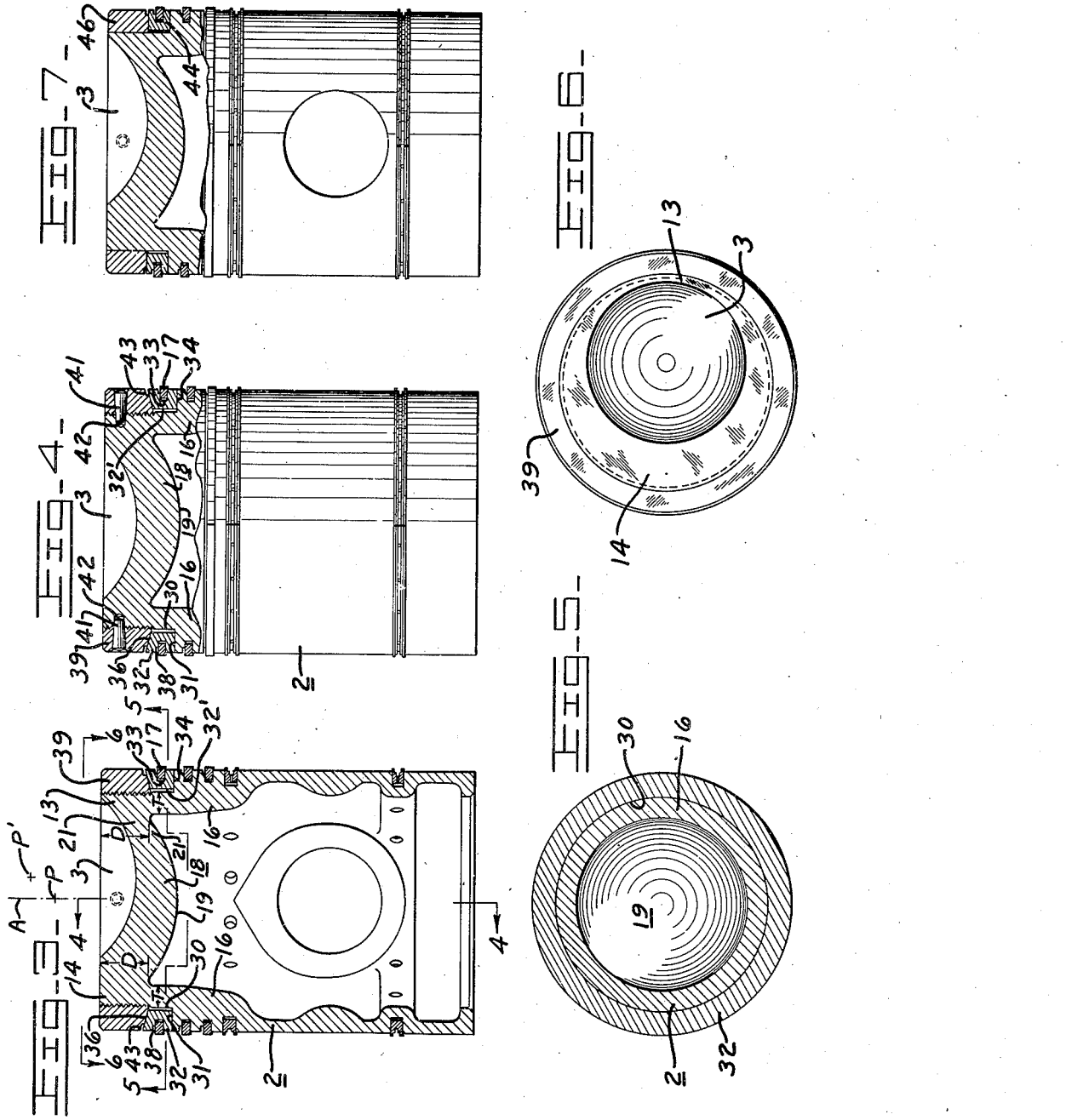
INVENTOR.
OSCAR L. STARR
BY Charles M. Fryer
ATTORNEY.

Patented June 18, 1946

2,402,213

UNITED STATES PATENT OFFICE 2,402,213

PISTON

Oscar L. Starr, Mission San Jose, Calif., assignor to Caterpillar Tractor Co., San Leandro, Calif., a corporation of California Original application July 8, 1940, Serial No. 344,304. Divided and this application November 12, 1943, Serial No. 509,961

4 Claims. (Cl. 123—191)

My invention relates to pistons and more particularly to an improved piston construction for internal combustion engines, designed to minimize distortion of a piston ring and its seating groove with consequent loss of sealing efficiency thereof, which would otherwise result from heat and also wear of the ring in its seating groove. The present application is a division of my copending application, Serial No. 344,304 for "Piston," filed July 8, 1940, which issued on May 30, 1944, and became Patent No. 2,349,917.

In many pistons, particularly those adapted for compression ignition engines (Diesel engines) of the type having an auxiliary combustion chamber, such as a precombustion chamber, the top or crown of the piston is frequently formed with a combustion crater which provides part of the main combustion chamber of the engine. Partially ignited fuel and hot air from the auxiliary combustion chamber pass into such crater during the combustion phase; and due to completion of combustion in the crater, it becomes hotter than the remainder of the piston crown. In order to provide for equal distribution of heat from the combustion crater to the periphery of the piston and thereby obviate distortion of the crown which results in the piston rings and their seating grooves becoming distorted or misalined with respect to the cylinder wall, thereby adversely affecting sealing relationship of such rings in their seating grooves and with the cylinder wall, it is desirable that the crater be disposed in the crown concentric with the axis of the piston.

However, this necessitates placing the auxiliary combustion chamber directly over the axis of the piston which if done, does not provide sufficient room in the head of the engine, for proper positioning of the intake and exhaust valves, and adequate cooling water jacket space therefor. Consequently, to provide ample room for the valves and sufficient cooling jacket space in the head of the engine, the auxiliary combustion chamber is generally inclined and offset to one side with respect to the axis of the piston; and this requires that the combustion crater in the crown of the piston be eccentrically disposed or offset with respect to the axis of the piston.

Heretofore, with such offset combustion crater, the wall of the crown under the crater was made of uniform thickness; and as a result, the heat flowed evenly through such wall causing the peripheral part of the piston closest to the crater to become hotter than the opposite peripheral part of the piston. Such parts are in the peripheral portion of the piston in which the piston rings are mounted, commonly designated as the ring belt portion of the piston; and because of the difference in temperature in such peripheral parts, the ring belt portion and the crown of the piston would warp or bow unequally. As a result, the top compression ring and its seating groove, because they are nearest the crown, and sometimes other rings and their seating grooves, if the warping were bad, even though in proper alinement with respect to the cylinder wall and in proper sealing relationship when the piston was cold, would be moved out of proper sealing relationship with respect to each other and out of alinement with respect to the cylinder wall when the piston was hot; and a poor seal of the ring in its groove and with the cylinder wall would result, causing loss of compression or blow-by.

Another problem in connection with efficient sealing of a piston ring with the cylinder wall, and also in the seating groove therefor, results from the fact that for dissipating heat rapidly from the piston, which is particularly desirable in compression ignition engines because they operate under relatively high maximum temperatures, it is advantageous to have the piston of metal, such as aluminum, which has relatively high heat conductivity. Also, a metal such as aluminum, possesses the additional advantage of imparting lightness to the piston. Aluminum is relatively soft compared to cast iron, especially at operating temperatures of a piston crown; the latter material being generally employed for piston rings. As a result, when a piston ring is seated in a ring groove formed directly in an aluminum piston body, it readily wears the seat which results in play and consequently loss of sealing efficiency with the cylinder wall, and also with its seating groove. This is particularly disadvantageous with respect to the top compression ring of the piston, which in order to prevent blow-by should maintain a good seal in its seating groove and with the cylinder wall at all times.

My invention is designed to overcome the above-mentioned problems, and has as its objects, among others, the provision of an improved piston construction; in which a crown having an offset combustion crater therein is so shaped as to distribute or dissipate heat evenly or uniformly to the periphery of the piston; means independent of a piston body and of relatively hard material is employed to provide a wear resistant seat for a piston ring and which is so mounted in the piston body as to have a certain degree of freedom of movement so as not to follow distortions of the piston body; and in which such means is yet firmly held in the piston body. Other objects of my invention will become apparent from the following description thereof.

In general, the preferred piston of my invention is provided with a spherical combustion crater in the crown thereof, which is offset with respect to the axis of the piston to receive hot air and partially ignited fuel which are discharged from an auxiliary combustion chamber in the head of an engine, also offset with respect to the axis of the piston, for the reasons previously explained. As a result of the offset or eccentric location of the crater in the piston crown, one peripheral part of the piston is closer to the crater than the opposite peripheral part of the piston; and as a result, the closest peripheral part tends to become hotter than the opposite peripheral part. To cooperate in equalizing a flow of heat to the periphery of the piston, so as to have the entire periphery of the piston adjacent the crown of substantially equal temperature and thereby minimize distortion of the crown portion of the piston when it expands or contracts resulting from change in temperature, the sectional thickness of the wall of the crown is tapered between the peripheral part of the piston closest to the combustion crater and the peripheral part opposite thereto, with the narrow portion of such wall thickness adjacent the peripheral part of the piston closest to the crater.

The taper or non-uniform thickness of the wall of the crown is accomplished by having the under-surface of the wall of the crown spherically shaped and concentrically arranged with respect to the axis of the piston, to thereby be symmetrical with respect to such axis. The thickness of the piston wall adjacent the periphery of such under-surface to the periphery of the piston is made substantially the same all the way around, and the distance between the periphery of the under-surface and the top of the piston is also substantially the same all the way around. As a result of the described crown construction, the narrow portion of the wall of the crown serves to restrict or throttle the flow of heat to that peripheral part of the piston closest to the combustion crater and unequal bowing of the top of the piston is substantially eliminated to thus minimize distortion of each of the piston rings from a transverse plane at a right angle to the axis of the piston; particularly the top compression ring which is most important for minimizing blow-by. Hence, sealing efficiency of the rings with the cylinder wall and in their seating grooves is enhanced.

The piston body proper is preferably of a light metal of high heat conductivity, such as aluminum, for the reasons previously explained; and to preclude a harder metal piston ring from wearing into the softer body of the piston and thereby develop excessive play which would destroy the sealing efficiency of the piston ring in its seating groove and with respect to the cylinder wall, I provide an independent hard metal wear resistant ring groove band for mounting of the piston ring. Such band may be provided for all of the upper piston rings but in the preferred construction, I provide it for only the top compression piston ring which is the ring located closest to the crown and consequently subject to greatest distortion. Preferably, the ring groove band is free of molecular union with the body of the piston as it is not cast integral therewith or otherwise molecularly secured to such body, but is removably but firmly attached to the piston body by suitable securing means. Although it is firmly held, it has a certain limited degree of freedom of movement by virtue of its non-molecular union with the piston body which is advantageous because the band will not follow all piston distortions resulting from changes in temperature thereof; and this cooperates in maintaining proper seating of a piston ring in the band groove therefor and also alinement of such piston ring with respect to a cylinder wall.

For retaining the ring groove band on the body of the piston, a securing ring may be shrunk on such body over the band, but I prefer to employ a threaded securing ring having a screw connection with the peripheral part of the piston crown, as this allows application of correct degree of pressure on the ring groove band for holding it.

Reference is now made to the drawings for a more detailed description of the invention in which:

Fig. 3 is a vertical sectional view of the piston of my invention.

Fig. 4 is a vertical sectional elevation of such piston; with the section taken in a plane indicated by line 4—4 in Fig. 3.

Fig. 5 is an underneath sectional elevation of the crown portion of the piston of my invention, taken in planes indicated by line 5—5 in Fig. 3.

Fig. 6 is a top view of the piston taken in a plane indicated by line 6—6 in Fig. 3.

Fig. 7 is a vertical sectional elevation of a modified form of piston construction.

Figure 1:
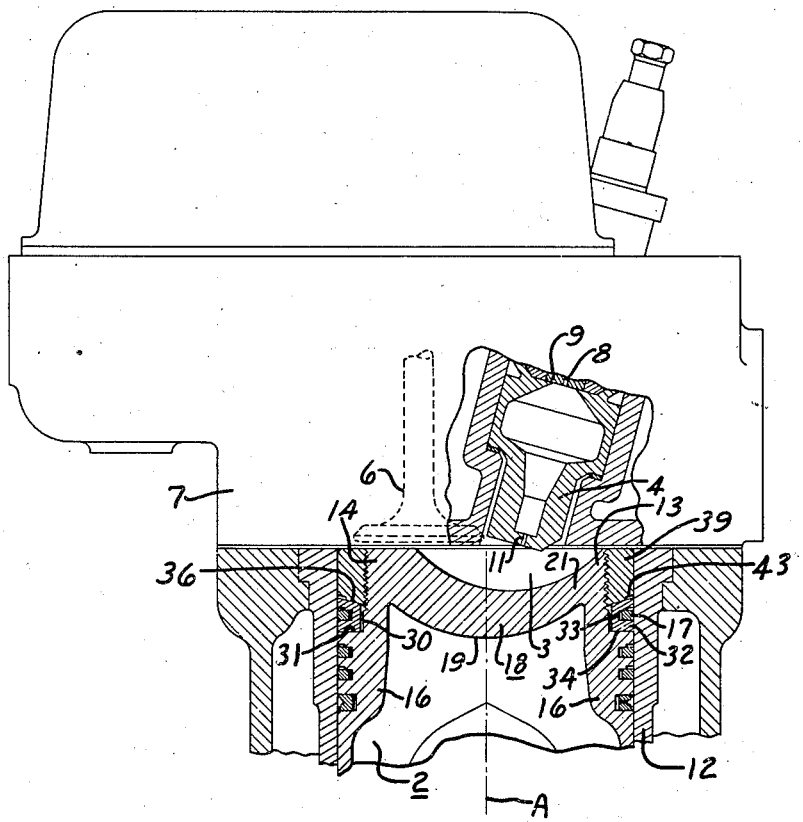
Fig. 1 is a fragmentary vertical sectional view, partly in elevation, of the piston of my invention mounted in an engine; portions of the head of such engine being shown schematically.
Figure 2:
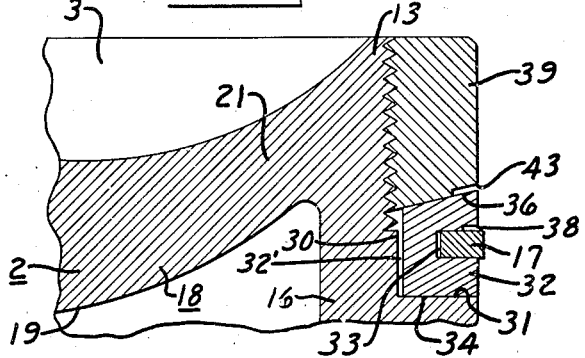
Fig. 2 is a fragmentary enlarged sectional view of the piston of my invention, illustrating the mounting of the ring groove band.

With particular reference to Figs. 1 and 6, the piston of my invention comprises body 2, preferably of a metal having a relatively high heat conductivity such as aluminum, and which is formed with combustion crater 3 in the crown thereof, in the form of a segment of a sphere. Such spherically shaped crater is offset or eccentrically disposed with respect to the piston axis A; and by virtue of its offset relationship the piston is particularly adapted for employment in a compression ignition engine having an auxiliary combustion chamber in the form of precombustion chamber 4 which is inclined along an axis offset with respect to the axis A of the piston, to allow room for valves 6 and adequate cooling jacket space in the head 7 of the engine. During the combustion phase, fuel is injected into precombustion chamber 4 from orifice 8 of fuel injection nozzle 9; and from the precombustion chamber partially ignited fuel and hot combustion air are discharged through orifice 11 into combustion crater 3. In Fig. 1, the piston is shown in cylinder 12 of the engine, which is preferably in the form of a removable liner.

Because of the offset relationship of combustion crater 3, it will be apparent from Figs. 1, 3 and 6 that such crater lies closer to peripheral part 13 of the piston than to the opposite peripheral part 14. Hence, such peripheral part 13 tends to become hotter when subjected to the operating temperatures of the engine, and consequently tends to expand more which would result in uneven movement of the piston ring mounting or peripheral belt portion 16 of the piston; particularly the peripheral portion adjacent the top compression ring 17 which is closest to the crown.

To equalize the flow of heat and thereby avoid the above-described objectionable feature, the wall 18 of the piston crown underneath combustion crater 3 is shaped to throttle or choke the flow of heat toward the peripheral part 13 of the piston which tends to become hottest. With reference to Figs. 3 and 5, this is accomplished by forming the under surface 19 of wall 18 substantially symmetrical with respect to axis A of the piston. Such under surface 19 is substantially spherical, the radius of curvature of which is from a center on the axis of the piston designated by point P. The radius of curvature of the spherical combustion chamber 3 is from a center designated by point P' offset with respect to the axis of the piston. Consequently, wall 18 is tapered between the peripheral parts 13 and 14 of the piston, with the narrow portion 21 of wall 18 adjacent peripheral part 13 which tends to become hottest. As a result, flow of heat is choked or throttled to such peripheral part 13 to cooperate in equalizing flow of heat. The thickness of narrow portion 21 of wall 18 and the degree of taper of wall 18 will determine the extent to which such narrow portion throttles the flow of heat. By choosing the proper vertical and transverse distances between points P and P', the correct degree of taper of wall 18 and the proper thickness of narrow wall portion 21, may be readily obtained for any given size piston. Because of the substantially symmetrical shape of the under-surface 19 of the wall 18 of the piston crown, a substantially uniform wall thickness T obtains from adjacent the periphery of under-surface 19 to the periphery of the piston; and the periphery of under-surface 19 is substantially the same distance D all the way around, from the top surface of the crown of the piston. This is also important in obtaining substantial equal expansion and contraction of the peripheral portion of the piston adjacent the crown, to obviate distortion.

The described shape of the crown wall 18 of the piston may be employed alone in any type of piston having an offset combustion crater in its crown, and made of any suitable material, to perform the described function of equalizing flow of heat to minimize distortion. However, since the preferred piston in which my invention is employed is made of aluminum, for the reasons previously explained, in which harder metal piston rings would wear in their seating grooves, and thus develop play with consequent loss of sealing efficiency, I preferably also employ in such piston a special mounting for at least the important top compression ring to obviate such development of play and cooperate with the special crown wall construction of my invention in maintaining proper alinement thereof with respect to the cylinder wall.

For this purpose, the top peripheral portion of the piston is formed with peripheral recess 30 which provides peripheral shoulder 31 for supporting an independent one piece or integral, unbroken piston ring groove band 32 in recess 30, and which fits with slight radial clearance 32' at its inside; the inside radial clearance precluding binding of the band against the body of the piston when the parts of the piston expand under operating temperatures to which the piston may be subjected. As a result, such arrangement cooperates in maintaining efficacious sealing relationship of the piston ring 17, seated in peripheral ring groove 33 formed in the band. Such band 32 is made of relatively hard metal, such as cast iron, to provide a wear resistant seat for the piston ring in ring groove 33. Band 32 does not serve in the capacity of a packing or sealing ring, as such function is accomplished by piston ring 17; and in this connection, it will be noted that because the band 32 is integral and unbroken, it is non-elastic radially. Furthermore, the peripheral face of the band 32 does not project substantially beyond the peripheral face of the piston body but is substantially coextensive with such piston body face. Preferably, the under surface 34 of such band and shoulder 31 lie in a plane extending at a right angle to the axis of the piston and the upper surface 36 of the band is inclined to provide a compensating feature, which are described more fully, and claimed in my Patent No. 2,349,919 issued May 30, 1944, for "Fitting of members." Also, the top side of piston ring groove 33 in band 32 is preferably formed with an annular blow-by minimizing channel 38, the purpose of which is more fully described, and claimed in my Patent No. 2,349,918 issued May 30, 1944, for "Piston construction."

I preferably firmly retain ring groove band 32 in position by means of internally threaded securing ring or nut 39 of any suitable material, such as aluminum, having a screw connection in recess 30 with body 2 of the piston. By turning securing ring 39 the correct number of turns, the proper degree of pressure may be applied to hold or clamp ring groove band 32 firmly in position; and because of such firm holding of the band, it cannot rotate about the axis of the piston. To prevent rotational movement of securing ring 39 after it is once screwed onto the piston the proper extent, I preferably provide diametrically opposite tapered pins 41 (Fig. 4) which pass transversely through suitable apertures formed in the securing ring and into recesses 42 formed in the body of the piston. Only one pin 41 may be employed if so desired. Preferably, the underside of securing ring 39, adjacent band 32, is formed with a peripheral notch or recess 43 so as to avoid application of pressure directly over the outer peripheral portion of ring groove band 32, and hence obviate pinching of the piston ring which would result in undesirable distortion thereof.

Since ring groove band 32 is of hard metal, it will resist wear resulting from forces which tend to move a piston ring therein, which forces always obtain during operation of a piston in an engine. Hence, play between the piston ring and its seating groove 33 is minimized; and the piston ring will not only remain in good sealing relationship with its groove but it will also be maintained in proper sealing alinement with respect to the cylinder wall. Ring groove band 32 may be made of sufficient depth to support more than one piston ring but I find that for minimizing blow-by in a cylinder, the top compression ring is the important factor. Hence in the preferred construction, I only employ the independent ring groove band 32 for the top compression ring 17 which is mounted therein.

It is to be noted from the preceding description that although ring groove band 32 is rigid and firmly held in position, it is free of molecular union with the body of the piston since it is not attached to such body or otherwise molecularly secured thereto by welding or other means. As a result, the band tends to have a certain limited degree of freedom of movement, which is enhanced by the inside radial clearance space 32'. Such limited freedom of movement is desirable because the band will not follow all distortions of the piston crown; and this feature alone helps to maintain proper alinement of a piston ring in the band, with respect to a cylinder wall, and also proper sealing of such ring in its seating groove. Consequently, the independent ring groove band, irrespective of whether it is of harder material than a piston ring adapted to be mounted therein, or of different material than a piston body, has utility alone when employed in any kind of piston.

The special preferred shape of ring groove band 32 and the blow-by minimizing channel 38 therein are desirable for the purposes explained in my patents to which I have previously referred. However, in so far as providing the constructional feature of a wear resistant seat for a piston ring mounted therein, is concerned, the ring groove band may be made flat or any other suitable shape as long as it is of hard metal sufficient to resist wear of a piston ring therein, and it need not be formed with a blow-by minimizing channel. Also, any other suitable means may be employed to hold such ring groove band in position. In Fig. 7, I have illustrated a modified form of construction in which the ring groove band 44 is provided with perfectly flat top and bottom surfaces extending at a right angle with respect to the axis of the piston; and it is held in position by means of securing ring 46 shrunk on the piston body. Such construction, irrespective of the material of ring groove band 44, will also provide the advantage resulting from the limited freedom of movement of the band.

The special constructional mounting of my invention for piston rings, may be employed in any type of piston formed with or without a crater. However, in the particular piston wherein my invention is employed and which has the offset combustion crater, both the special shape of the piston crown and the special ring mounting are desirable as they both cooperate in minimizing misalinement of a piston ring, particularly the top compression ring, with respect to a cylinder wall, and they cooperate to maintain proper sealing of said ring in its seating groove.

I, therefore, claim as my invention:

1. A piston of the type in which the crown thereof is provided with a recess forming a combustion crater offset with respect to the axis of the piston, whereby the peripheral part of the piston closest to the crater tends to become hotter than the opposite peripheral part of the piston, the periphery of the piston adjacent the crown having a piston sealing ring seating groove therein, a ring in said groove, the under-surface of the wall of said crown being convex, and the cross section of said wall gradually increasing in thickness between said peripheral parts with the narrow portion thereof adjacent said first mentioned peripheral part, to throttle flow of heat thereto and thus substantially equalize said flow of heat to such peripheral parts, whereby misalinement of said piston ring which might otherwise occur from unequal heat distribution is minimized.

2. A piston of the type in which the crown thereof is provided with a recess forming a substantially spherical combustion crater offset with respect to the axis of the piston, whereby the peripheral part of the piston closest to the crater tends to become hotter than the opposite peripheral part of the piston, the periphery of the piston adjacent the crown having a piston sealing ring seating groove therein, a ring in said groove, the under-surface of the wall of said crown being convex and of substantially spherical contour substantially symmetrical with respect to the axis of the piston, and the cross section of said wall gradually increasing in thickness between said peripheral parts with the narrow portion thereof adjacent said first mentioned peripheral part, to throttle flow of heat thereto and thus substantially equalize said flow of heat to such peripheral parts, whereby misalinement of said piston ring which might otherwise occur from unequal heat distribution is minimized.

3. A piston of the type in which the crown thereof is provided with a recess forming a substantially spherical combustion crater the center of the radius of curvature of which is offset relative to the piston axis, whereby the crater is offset with respect to such axis and the peripheral part of the piston closest to the crater tends to become hotter than the opposite peripheral part of the piston, the periphery of the piston adjacent the crown having a piston sealing ring seating groove therein, a ring in said groove, the under-surface of the wall of said crown being convex and of substantially spherical contour the center of the radius of curvature of which is substantially on the piston axis whereby such under-surface is symmetrical with respect to said axis, the wall thickness of the piston being substantially uniform from adjacent the periphery of said under-surface to the periphery of the piston, the periphery of said under-surface being substantially the same distance all the way around from the top surface of the piston crown, and the cross section of said crown wall gradually increasing in thickness between said peripheral parts with the narrow portion thereof adjacent said first mentioned peripheral part, to throttle flow of heat thereto and thus substantially equalize said flow of heat to such peripheral parts, whereby misalinement of said piston ring which might otherwise occur from unequal heat distribution is minimized.

4. A piston having a crown with a convex undersurface of substantially spherical contour, the center of the radius of curvature of which is coincidental with the piston axis, and having a combustion crater in its upper surface of substantially spherical contour, the center of the radius of curvature of which is offset from the piston axis to provide a crown wall of unequal thickness for controlling the distribution of heat from the combustion crater to the periphery of the piston.

OSCAR L. STARR.